Figure 1:
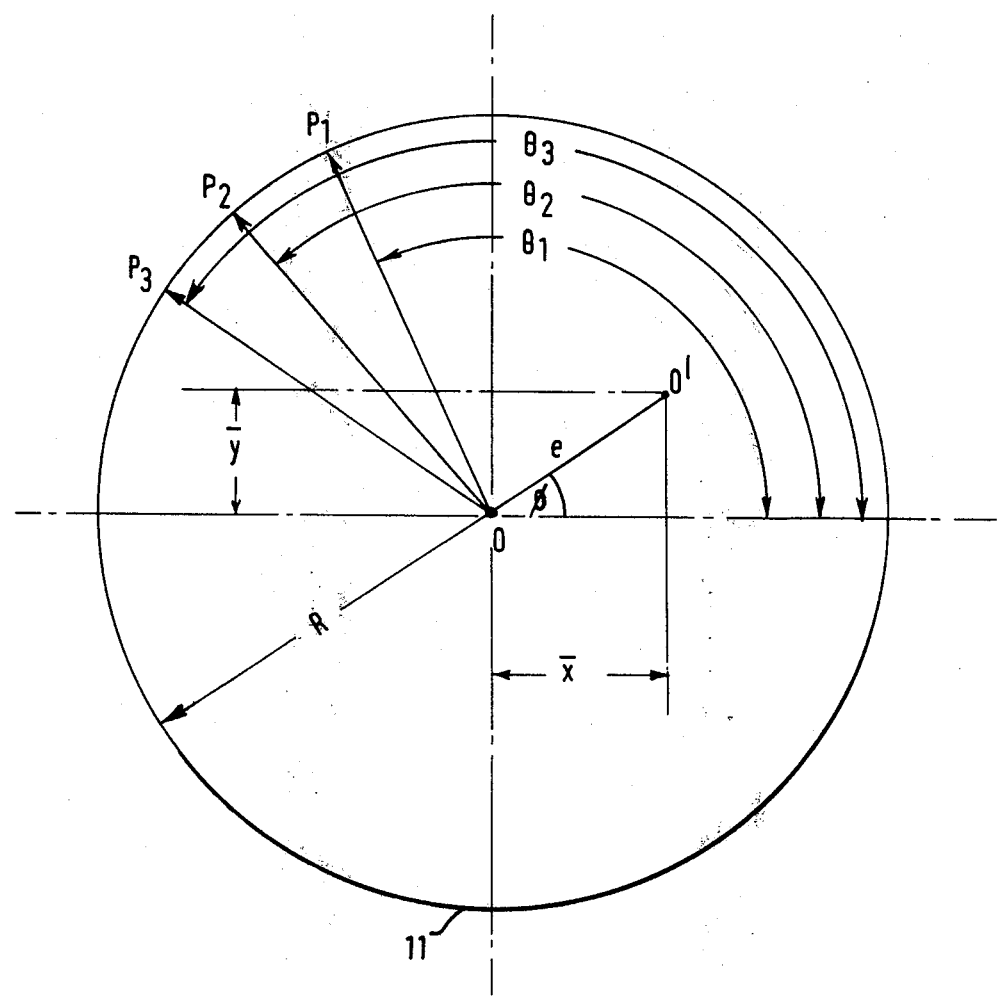

United States Patent [19]

Whitehouse et al.

[11] 4,342,091

[45] Jul. 27, 1982

[54] METHOD OF DETERMINING THE COORDINATES OF THE CENTER OF CURVATURE OF THE CURVED SURFACE OF A WORKPIECE

[75] Inventors: David J. Whitehouse, Melton Mowbray; Harish C. Sharma, Leicester, both of England

[73] Assignee: The Rank Organisation Limited, London, England

[21] Appl. No.: 109,305

[22] Filed: Jan. 3, 1980

[30] Foreign Application Priority Data

Jan. 4, 1979 [GB] United Kingdom ................ 7900230

[51] Int. Cl.³ .......................... G06F 15/20; G01B 7/28
[52] U.S. Cl. .................................. 364/506; 33/174 L; 33/174 P; 364/551
[58] Field of Search ............... 364/463, 552, 559, 564, 364/507, 551, 506; 33/124, 125 M, 142, 174 L, 174 P, 174 PA, 174 PC, 1 N, 1 BB, 1 R, 1 M; 73/104, 105; 318/578

[56] References Cited

U.S. PATENT DOCUMENTS

| | | | |
|---|---|---|---|
| 3,231,979 | 2/1966 | Perthen et al. | 33/174 L |
| 3,869,802 | 3/1975 | Pirner | 33/174 L |
| 3,885,318 | 5/1975 | Whitehouse et al. | 33/174 P X |
| 3,895,446 | 7/1975 | Orlov et al. | 33/174 L |
| 4,026,031 | 5/1977 | Siddall et al. | 33/174 L |
| 4,084,324 | 4/1978 | Whitehouse | 33/174 L |

FOREIGN PATENT DOCUMENTS 1553414  9/1979  United Kingdom ............... 33/1 BB

*Primary Examiner*—Joseph F. Ruggiero
*Attorney, Agent, or Firm*—Brisebois & Kruger

[57] ABSTRACT

A method of determining the coordinates of the center of curvature of the curved surface of a workpiece with respect to a predetermined frame of reference the origin of which coincides with the center of relative rotation between the workpiece and a sensor of a surface measurement instrument. The method requires sensor signals to be derived at only three points along the traverse of the sensor and there are no constraints on the position or symmetry of the three points thereby allowing the method to be used on workpieces having only a partial arc. Two output signals representing the x and y coordinates of the center are produced from signals representing the angular position of the three points and from the sensor signals at the said three points.

3 Claims, 2 Drawing Figures

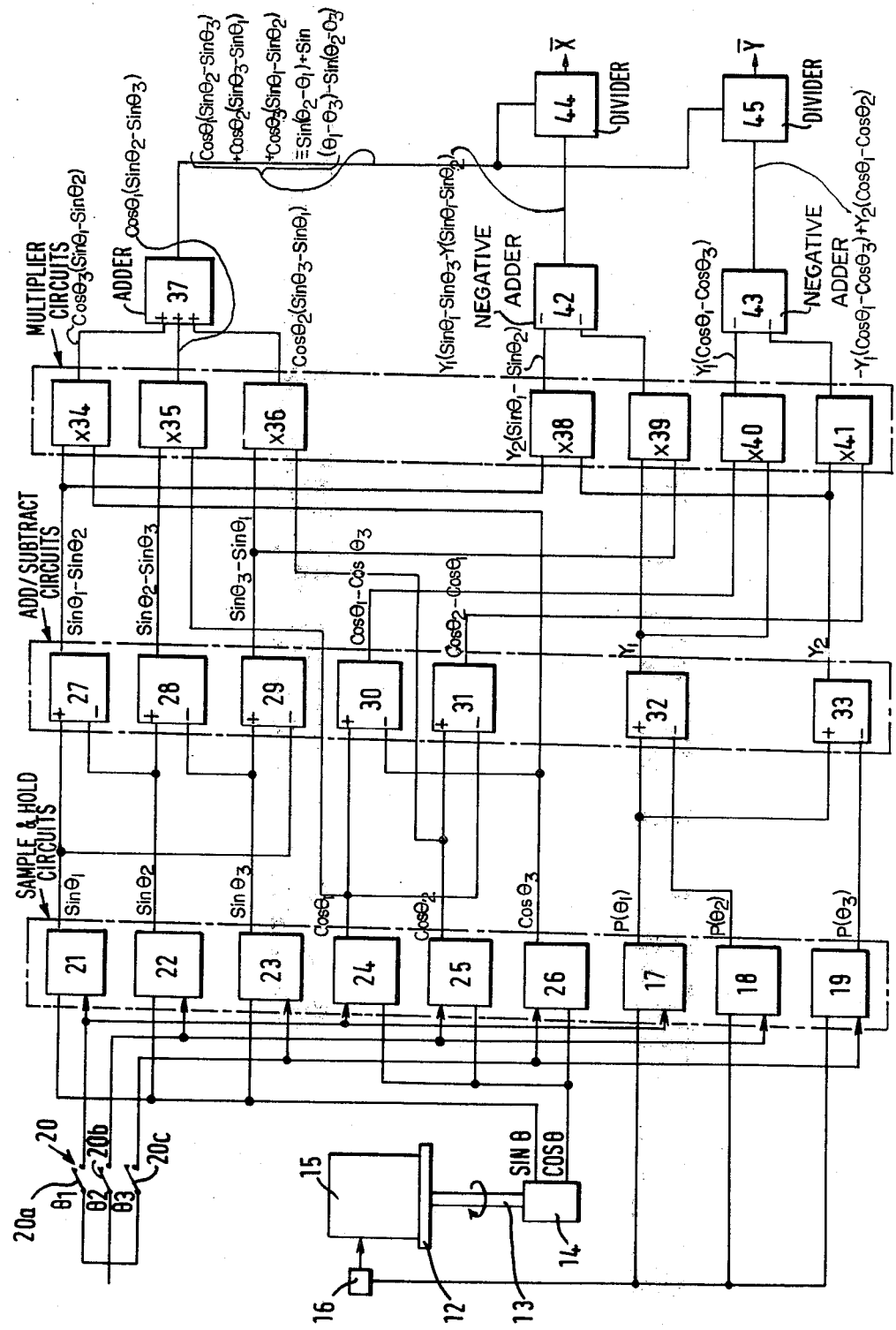

METHOD OF DETERMINING THE COORDINATES OF THE CENTER OF CURVATURE OF THE CURVED SURFACE OF A WORKPIECE

The present invention relates to a method of surface testing and to apparatus for employing the method, and in particular to apparatus suitable for use with surface measurement instruments of a known type having a table on which a workpiece can be mounted and a sensor which is so mounted that it can be drawn in contact with the surface of a workpiece mounted on the table upon relative rotation of the sensor and the table, the sensor thus producing output signals representative of departures of the surface from its perfect nominal form. The relative rotation between the table and the sensor may be effected by maintaining the sensor fixed and rotating the table, or by maintaining the table fixed and causing the sensor to turn about it. There is no fundamental difference, as far as the sensing of the workpiece surface is concerned between either system. Surface measuring instruments of this type will be referred to hereinafter as "surface measurement instruments of the type described."

In such an instrument the output signals from the sensor are amplified and displayed to provide a representation of the particular form of the workpiece surface. However, in order to provide a meaningful display the sensor output signals can represent only the variations of the surface itself, and the actual radius of the workpiece is effectively suppressed in obtaining the output signals representative of the surface. For accuracy of the resulting output signals and the display representative thereof it is essential that the centers of the workpiece and the relative rotation between the workpiece and the sensor are substantially coincident to within close limits of accuracy.

For workpieces of large diameter, or workpieces having only a partial arc, that is a curve which does not extend through 360°, it is particularly difficult accurately to locate the center of curvature of the curved surface with the center of relative rotation of the workpiece and the sensor. This, however, is an essential operation in setting up a surface measurement instrument and when such instruments are used for the testing of component parts on a mass production basis it represents a considerable amount of wasted labor.

Surface measurement instruments have, in the past, been fitted with apparatus for automatically determining the eccentricity between the center of a workpiece and the center of relative rotation between the workpiece and a sensor, but these have required several complete traverses around a continuous curved surface before they could provide output signals of sufficient accuracy for use in making the necessary adjustments to the relative positions of the workpiece and the sensor. Such a system is clearly not usable for workpieces of which the curved surface is only a partial arc.

A recent proposal has been made for a method of determining the eccentricity of a workpiece by deriving an output signal from the sensor output in a limacon form, and although this method is accurate it is somewhat involved and expensive. Another proposal has been made for a method of determining the eccentricity of the center of curvature of the curved surface of a workpiece, which provides a suitable approximation for the initial centering of a workpiece, by determining the value of the sensor output signal at each of three points along the traverse and using these values to derive signals representing the eccentricity from a knowledge of the angular positions, with respect to a fixed frame of reference, of the three points. The eccentricity is then expressed with respect to this fixed frame of reference; however, it is a constraint of this known method that the middle point must lie on the intersection of the surface with one of the axes of the fixed frame of reference. For this the sensor must describe an arc on the surface of the workpiece which extends symmetrically on either side of one of the instrument axes, which itself involves very careful positioning of the workpiece on the instrument table. Any attempt to make this prior proposal practicable for a general arc rather than a particular arc leads to very complex computations requiring complex and expensive extra equipment.

Another approach to this problem is to make a partial traverse with the sensor and record the transducer signals at only two points spaced along the traverse, usually the end points of the traverse for the purpose of obtaining the greatest separation and thereby reduce inaccuracies. The two signals are differentiated and from the differentiated signals, and signals representing the angular separation of the two points along the traverse at which the readings were taken the value of the eccentricity components $\bar{x}$ and $\bar{y}$ of the center of the component with respect to the instrument axis can be computed. The differentiation of the profile signals employed in this latter method is required in order to eliminate one of the variables in the computation thereby simplifying the process. For components having a good surface finish, and which are nominally round, for example ball bearings or ball bearing races, this differentiation is not a disadvantage, but if there is any significant noise on the component the differentiation produces serious distortion and the result can contain unacceptable errors. The noise is equally a problem whether the differentiation is performed in an analogue or digital manner. For economy, however, analogue systems are most likely to be used and in this case even slight dither in the rotational direction will manifest itself as noise causing distortion due to the differentiation.

The present invention seeks to provide a method of determining the coordinates of the eccentricity of a workpiece mounted on the table of an instrument of the type described which can produce adequately accurate results from a partial traverse, but which does not require differentiation of the profile signals in order to eliminate one of the variables of the computation.

According to the present invention a method for determining the coordinates of the center of curvature of the curved surface of a workpiece with respect to a predetermined frame of reference the origin of which coincides with the center of relative rotation between the workpiece and a sensor of a surface measurement instrument of the type described comprises the steps of traversing the sensor over the workpiece surface, deriving from the sensor output three signals representing the value of the sensor signal at three points along the traverse of the sensor, and computing from these signals, and from signals representing the angular position of the said three points, two output signals representing the expression $$\bar{x} = \frac{Y_1(\sin\theta_1 - \sin\theta_3) - Y_2(\sin\theta_1 - \sin\theta_2)}{\sin(\theta_1 - \theta_3) + \sin(\theta_2 - \theta_1) - \sin(\theta_2 - \theta_3)}$$

$$\bar{y} = \frac{-Y_1(\cos\theta_1 - \cos\theta_3) + Y_2(\cos\theta_1 - \cos\theta_2)}{\sin(\theta_1 - \theta_3) + \sin(\theta_2 - \theta_1) - \sin(\theta_2 - \theta_3)}$$

where $\bar{x}$ and $\bar{y}$ respectively represent the coordinates of the center of the workpiece parallel to and perpendicular to one axis of the said predetermined frame of reference.

$\theta_1$, $\theta_2$ and $\theta_3$ represent the angular position of the said three points along the traverse of the sensor, with respect to the said one axis of the predetermined frame of reference, and $Y_1$ and $Y_2$ represent the difference between the values of the sensor signals at the first and second points and at the first and third points respectively.

This method, unlike the previous three point method mentioned above, places no constraints on the location of the center point so that if a surface available for test has only a partial arc the three points of the traverse can nevertheless be positioned conveniently without requiring the workpiece to be positioned on the table with high accuracy as was previously the case.

It will be appreciated that this method involves an approximation and does not provide high accuracy; for example, results may contain an error, at certain angles, as much as 30%, but since the object of determining the eccentricity components is to adjust the workpiece to a centered position, the method may be used iteratively, the component being adjusted in accordance with results of the method which is then repeated. Providing the error is less than 100% this process inevitably leads to accurate positioning of the workpiece.

Likewise, for increased accuracy, the method may be performed by traversing the sensor over limited arcs extending over two or more different parts of the workpiece surface, and then deriving a signal representing the average value of the coordinates thus found.

One embodiment of the invention will now be more particularly described, by way of example, with reference to the accompanying drawings, in which:

FIG. 1 is a diagram illustrating, by way of example, the angles and distances involved, and FIG. 2 is a schematic block diagram of the embodiment.

Referring first to FIG. 1, the circle 11 represents a workpiece and the coordinate axes x, y have their origin at the center O of the workpiece. It is assumed that the workpiece is positioned on the table of an instrument of the type described and has been roughly centered using preliminary techniques. The residual eccentricity between the center O of the workpiece 11 and the center O' of the table is indicated by the line e which lies at an angle $\phi$ from the x axis. The radius of the component 11 is indicated R, and it has been found in practice that for a component the radius of which is in the region of 25 mm the eccentricity is likely to be in the region 0.3 to 0.4 mm. In use of an instrument of the type described the sensor is traversed around the surface of the workpiece 11, either by rotating the worktable while maintaining the sensor fixed, or by maintaining the table fixed and causing the sensor to follow a circular path centered on the table axis O'. It can be shown that the instantaneous value of the signal from the sensor at any point $\theta$ around its traverse is given by:

$$\rho(\theta) = C + e\cos(\theta - \phi) - \frac{e^2}{2R}\sin^2(\theta - \phi) - \frac{e^4}{8R^3}\sin^4(\theta - \phi)\ldots$$

In the example outlined above of a component in the region of 25 mm radius with an eccentricity e in the region of 0.3 to 0.4 mm, the third term, that is the term involving $e^2/2R$, and all subsequent terms, can be ignored so that, to an approximation, the sensor signal can be represented by:

$$\rho(\theta) = C + e\cos(\theta - \phi)$$

For the method of the invention, in which the sensor signal is taken at three points around a limited arc of the workpiece surface, there are therefore three simultaneous equations containing the unknowns C, e and $\phi$. These can be solved for e and $\phi$ to give the eccentricity of the workpiece with respect to the spindle axis of the instrument so that these values can be used to adjust the position of the workpiece on the table to move the centers O and O' closer into coincidence.

In fact, rather than expressing the result in polar coordinates, the Cartesian coordinates of the eccentricity can be generated since these are more convenient for adjusting workpiece mounting clamps in the x and y directions.

Thus, the three expressions for the values of the sensor signal at the three points $P_1$, $P_2$ and $P_3$ on the surface of the workpiece which subtend respective angles of $\theta_1$, $\theta_2$ and $\theta_3$ from the x axis are given by $$\rho(\theta_1) = C + e\cos(\theta_1 - \phi) \quad \text{(i)}$$

$$\rho(\theta_2) = C + e\cos(\theta_2 - \phi) \quad \text{(ii)}$$

$$\rho(\theta_3) = C + e\cos(\theta_3 - \phi) \quad \text{(iii)}$$

The solution of the three simultaneous equations can be conveniently effected by subtracting equations (ii) and (iii) from equation (i) thus:

$$\rho(\theta_1) - \rho(\theta_2) = Y_1$$

$$\rho(\theta_1) - \rho(\theta_3) = Y_2$$

Substituting the expressions for the sensor signal values to eliminate the constant C gives $Y_1 = e\{(\cos\theta_1\cos\phi + \sin\theta_1\sin\phi) - (\cos\theta_2\cos\phi + \sin\theta_2\sin\phi)\}$ $Y_2 = e\{(\cos\theta_1\cos\phi + \sin\theta_1\sin\phi) - (\cos\theta_3\cos\phi + \sin\theta_3\sin\phi)\}$ Now, since it can be seen, by trigonometry, that $\bar{x} = e\cos\phi$ and $\bar{y} = e\sin\phi$ it is possible to eliminate $\phi$ and the expressions for x and y become:

$$\bar{x} = \frac{Y_1(\sin\theta_1 - \sin\theta_3) - Y_2(\sin\theta_1 - \sin\theta_2)}{\sin(\theta_1 - \theta_3) + \sin(\theta_2 - \theta_1) - \sin(\theta_2 - \theta_3)}$$

$$\bar{y} = \frac{Y_1(\cos\theta_1 - \cos\theta_3) + Y_2(\cos\theta_1 - \cos\theta_2)}{\sin(\theta_1 - \theta_3) + \sin(\theta_2 - \theta_1) - \sin(\theta_2 - \theta_3)}$$

Now since $Y_1$ and $Y_2$ are merely the differences respectively between $\rho(\theta_1)$ and $\rho(\theta_2)$ and between $\rho(\theta_1)$ and $\rho(\theta_3)$ the expressions for $\bar{x}$ and $\bar{y}$ thus derived contain only information derived from the sensor output signal at the three points $P_1$, $P_2$ and $P_3$ of the traverse, and information concerning the trigonometrical values of the angles $\theta_1$, $\theta_2$ and $\theta_3$. There are no restraints on the relative positions of the points $P_1$, $P_2$ and $P_3$ but it will be appreciated that since the derivation involved an approximation there will be greater errors at certain angles, for example when $(\theta - \phi)$ is in the vicinity of 0° or 180°. Thus the constraints concerning the position of the intermediate point and the symmetry of the points $P_1$ and $P_3$ on either side of point $P_2$ which were necessary in previous three points centering methods are absent from this method.

Apparatus for performing this method is also simplified in that the angles $\theta_1$, $\theta_2$ and $\theta_3$ can be selected in advance so that a small computer or micro-processor can be set up to produce the trigonometrical values of these angles and only a potentiometer providing an output signal representing the angle $\theta$ and the signals from the sensor are required to be fed to the apparatus. Sine and cosine potentiometers required by previous methods are thereby avoided so that such apparatus can be at the same time simplified and made more economically.

In the embodiment illustrated in FIG. 2, however, a sine and cosine potentiometer is employed. In FIG. 2 there is shown a workpiece support table 12 mounted on a spindle 13 with which is linked a sine/cosine potentiometer 14. The workpiece support table 12 carries a component 15 under test in contact with which is a transducer 16, schematically illustrated in FIG. 2, which feeds output signals to three sample and hold circuits 17, 18, 19, as the information signal thereto.

Also associated with the spindle 13 are three switches, generally indicated 20, which can be adjusted to select the three angles $\theta_1$, $\theta_2$ and $\theta_3$; thus, the switch 20a closes when the spindle 13 reaches the angle, with respect to the fixed transducer 16, $\theta_1$, while the switch 20b closes at the angle $\theta_2$ and the switch 20c closes at the angle $\theta_3$. These switches are connected as the triggering inputs to the sample and hold circuits 17, 18, 19 so that the transducer output $\rho1$ is sampled and held by the circuit 17 when the spindle 13 is at the angle $\theta_1$ and likewise, the sample and hold circuit 18 receives a trigger signal to energize it to sample and hold the transducer signal at the angle $\theta_2$ and the sample and hold circuit 19 receives a signal at angle $\theta_3$ so that, during the traverse of the transducer over the surface of the component 15, three samples are taken at the angles preselected by the positions of the switches 20a, 20b, 20c representing the value of the transducer signal at those three angles.

The output of the sine/cosine potentiometer 14 is also fed to two sets of three sample and hold circuits. The sine output of the potentiometer 14 is fed to each of three sample and hold circuits 21, 22, 23 and the cosine output is fed to three sample and hold circuits 24, 25, 26. Each of these circuits also receives a respective trigger input from a respective switch 20a, 20b, 20c so that, during the traverse of the transducer over the surface of the component 15, the sample and hold circuit 21 samples a signal representing $\sin \theta_1$ and the other two circuits 22, 23 receive $\sin \theta_2$ and $\theta_3$ respectively. Likewise, the signals sampled by the circuits 24, 25 and 26 represent $\cos \theta_1$, $\cos \theta_2$ and $\cos \theta_3$ respectively. The outputs from the sample and hold circuits 17, 18, 19 carrying signals representing $\rho1$, $\rho2$ and $\rho3$ are fed to the positive and negative inputs of add/subtract circuits 32, 33 respectively so that the output of the circuit 32 represents $\rho1 - \rho2$ and the output of the circuit 33 represents $\rho1 - \rho3$. As described above the value $\rho1 - \rho2$ is conveniently indicated $Y_1$ and the value $\rho1 - \rho3$ is indicated $Y_2$.

The output signals from the three sample and hold circuits 21, 22, 23 representing, respectively, $\sin \theta_1$, $\sin \theta_2$ and $\sin \theta_3$ are fed to three further add/subtract circuits 27, 28, 29 in the manner illustrated in FIG. 2 so that the output from circuit 27 represents $\sin \theta_1 - \sin \theta_2$, the output from circuit 28 represents $\sin \theta_2 - \sin \theta_3$ and the output from ciruit 29 represents $\sin \theta_3 - \sin \theta_1$. In a similar way the cosine sample and hold ciruits 24, 25, 26 are connected to further add/subtract circuits 30, 31 in such a way that the outputs from these circuits represents $\cos \theta_1 - \cos \theta_3$ and $\cos \theta_2 - \cos \theta_1$ respectively.

The outputs from the sample and hold circuits 24, 25, 26 are also fed to respective inputs of three multiplier circuits 34, 35, 36 the other inputs of which each receive an input signal from a respective add/subtract circuit 27, 28, 29 so that the output from the multiplier 34 which receives inputs from the add/subtract circuit 27 and from the sample and hold circuit 26 is $\cos \theta_3 (\sin \theta_1 - \sin \theta_2)$, the output from the multiplier 35 which receives inputs from the add/subtract circuit 28 and the sample and hold circuit 24 is $\cos \theta_1 (\sin \theta_2 - \sin \theta_3)$ and the output from the multiplier 36 which receives input signals from the add/subtract fcircuit 29 and the sample and hold circuit 25 is $\cos \theta_2 (\sin \theta_3 - \sin \theta_1)$. The outputs from the three multipliers 34, 35, 36 are fed to an adding circuit 37 the output from which is thus $\cos \theta_3 (\sin \theta_1 - \sin \theta_2) + \cos \theta_2 (\sin \theta_3 - \sin \theta_1) + \cos \theta_1 (\sin \theta_2 - \sin \theta_3)$, and this is fed as the denominator input to each of two divider circuits 44, 45. The numerator inputs of the divider 44 and 45 are fed from respective negative adders 42 and 43 each of which serves to add its inputs and multiply the resultant sum by minus one. The inputs to the negative adder 42 are generated by two multiplier circuits 38, 39 the first of which is fed with the output signal from the add/subtract circuit 27 and the add/subtract circuit 33 and therefore represents $Y_2 (\sin \theta_1 - \sin \theta_2)$ and the other of which is fed from the add/subtract circuit 29 and the add/subtract circuit 32 and the output of which therefore represents $Y_1 (\sin \theta_3 - \sin \theta_1)$.

The output from the negative adder 42 thus represents the difference between the outputs from the two multipliers 39, 38, that is: $-Y_2 (\sin \theta_1 - \sin \theta_2) - Y_1 (\sin \theta_3 - \sin \theta_1)$. The output from the divider circuit 44, fed with the inputs discussed above, thus represents the value $\bar{x}$ as defined above given that the denominator $\cos \theta_3 (\sin \theta_1 - \sin \theta_2) + \cos \theta_2 (\sin \theta_3 - \sin \theta_1) + \cos 741 (\sin \theta_2 - \sin \theta_3)$ can be proven by simple trigonometry, to be identical with $\sin (\theta_1 - \theta_3) + \sin (\theta_2 - \theta_1) - \sin (\theta_2 - \theta_3)$, which is the denominator in the expression given for the coordinate $\bar{x}$ in the preamble.

In a similar way, the negative adder 43 is fed with the output signal from the multiplier 40 and with the output signal from the multiplier 41, the former of which receives input signals from the add/subtract circuit 30 and the add/subtract circuit 32 so that its output represents $Y_1 (\cos \theta_1 - \cos \theta_3)$ and the latter of which is fed with input signals from the add/subtract circuit 31 and the add/subtract circuit 33 so that its output signal represents $Y_2 (\cos \theta_2 - \cos \theta_1)$. Thus, the output from the divider circuit 45 represents $\bar{y}$ as defined above, given the same trigonometrical identity as that referred to above in relation to the computation of $\bar{x}$.

The circuit described above thus operates automatically to produce values $\bar{x}$ and $\bar{y}$ from a traverse of the transducer 16 over the component 15 mounted on the work table 12 once the three switches 20a, 20b, 20c have been set to determine the three angles $\theta_1$, $\theta_2$ and $\theta_3$.

What is claimed is:

1. A method of centering a workpiece having a curved surface with respect to an axis of relative rotation between said workpiece and a surface measurement instrument of the type comprising:

a table, means for mounting said workpiece on said table, a sensor, means mounting said sensor so that relative rotation between said sensor and said table can take place about an axis of relative rotation, said sensor being drawn in contact with the surface of said workpiece upon said relative rotation, comprising the steps of:

deriving signals representing the coordinates of the centre of curvature of said curved surface of said workpiece by traversing said sensor over the surface of said workpiece, electrically deriving from the output of said sensor three signals representing the value of said sensor signal at three points of said traverse of the sensor, generating signals representing the angular position of said three points, electrically determining the difference $Y_1$ between the values of said sensor signals at said first and second points, determining the difference $Y_2$ between the values of said sensor signals at said first and third points, and electrically generating from said signals representing the values of said sensor signals at said three points of said transverse of said sensor, and from said signals representing the angular position of said three points, two output signals representing the expressions:

$$\bar{x} = \frac{Y_1 (\sin\theta_1 - \sin\theta_3) - Y_2 (\sin\theta_1 - \sin\theta_2)}{\sin(\theta_1 - \theta_3) + \sin(\theta_2 - \theta_1) - \sin(\theta_2 - \theta_3)}$$

and $$\bar{y} = \frac{-Y_1 (\cos\theta_1 - \cos\theta_3) + Y_2 (\cos\theta_1 - \cos\theta_2)}{\sin(\theta_1 - \theta_3) + \sin(\theta_2 - \theta_1) - \sin(\theta_2 - \theta_3)}$$

where $\bar{x}$ and $\bar{y}$ respectively represent the coordinates of the centre of the workpiece parallel to and perpendicular to one axis of said predetermined frame of reference, and $\theta_1$, $\theta_2$ and $\theta_3$ represent the angular position of said three points along said traverse of said sensor, with respect to said one axis of said predetermined frame of reference, and displacing said workpiece with respect to said surface measurement instrument by a distance represented by said output signals thus produced, and repeating said process iteratively a plurality of times.

2. The method of claim 1, wherein said sensor is traversed over a limited arc of the surface of said workpiece.

3. The method of claim 2, wherein two of said three points of said traverse are the end points of said limited arc.

* * * * *